United States Patent
Witchger

[11] Patent Number: 5,930,058
[45] Date of Patent: Jul. 27, 1999

[54] THIN FILM MIRROR AND METHOD

[75] Inventor: William J. Witchger, Indianapolis, Ind.

[73] Assignee: Mir-Tec LLC, Indianapolis, Ind.

[21] Appl. No.: 08/867,105

[22] Filed: Jun. 2, 1997

[51] Int. Cl.⁶ .............................. G02B 5/08; G02B 7/188; G02B 7/182
[52] U.S. Cl. .......................... 359/847; 359/883; 359/514
[58] Field of Search .................... 359/846, 847, 359/848, 883, 509, 512, 513, 514; 52/785.1, 586.1; 248/466

[56] References Cited

U.S. PATENT DOCUMENTS

| | | | |
|---|---|---|---|
| 3,687,524 | 8/1972 | Martinez | 359/847 |
| 3,733,116 | 5/1973 | Hutchinson | 359/847 |
| 3,757,479 | 9/1973 | Martinez | 52/222 |
| 3,792,917 | 2/1974 | Martinez | 359/881 |
| 3,877,139 | 4/1975 | Martinez | 29/469.5 |
| 3,880,500 | 4/1975 | Kojabashian | 359/847 |
| 3,936,159 | 2/1976 | Pavenick | 359/847 |
| 3,973,834 | 8/1976 | Penn et al. | 359/847 |
| 4,454,703 | 6/1984 | Sitzler et al. | 52/586.1 |
| 4,666,263 | 5/1987 | Petcavich | 359/883 |
| 5,014,174 | 5/1991 | Won et al. | 362/309 |
| 5,247,395 | 9/1993 | Martinez | 359/883 |
| 5,552,006 | 9/1996 | Soliday et al. | 156/160 |

Primary Examiner—Cassandra Spyrou
Assistant Examiner—Mark A. Robinson
Attorney, Agent, or Firm—Woodard, Emhardt, Naughton, Moriarty & McNett Patent and Trademark Attorneys

[57] ABSTRACT

A thin film mirror including a frame, a board, and a thin plastic film having a reflective metal deposit on one side thereof. The thin plastic film is pre-stretched over the frame and is secured thereto by an epoxy adhesive and a double-sided tape which prevents creep of the mirror during curing of the epoxy. The board is adhered to the reverse of the frame in order to protect the reflective surface of the mirror and to impart additional rigidity to the structure. Various embodiments of the thin film mirror are provided which employ an aperture to connect the air space formed between the mirror and the board with the atmosphere to thereby avoid any deformation of the mirror's surface due to atmospheric pressure changes. These various embodiments also include filter mechanisms to allow air flow but prevent debris from entering the air space. Various other embodiments incorporate an opaque tape disposed at and adhered to the periphery of the mirror to disguise any imperfections therein. In this way, a precise planar mirror surface may be fabricated that has all the advantages of a traditional glass mirror without the undesirable weight and fragility associated with those mirrors.

24 Claims, 2 Drawing Sheets

THIN FILM MIRROR AND METHOD

BACKGROUND OF THE INVENTION

1. Field of the Invention

This invention relates generally to thin film mirrors and more particularly to the film support and method.

2. Description of the Prior Art

For many years, reflectors have been made in a variety of ways. For flat mirrors in sizes up to eight feet, glass was often used with a coating of silver or aluminum on the backside. Due to weight and safety considerations, and with the advent of high quality materials such as metal coated plastic film, large mirrors using such film as the reflecting medium, have been made and are widely used. Patents have been obtained on some such mirrors. An example is U.S. Pat. No. 5,247,395 issued Sep. 21, 1993, and reference patents listed therein.

This and the other prior art of which I am aware leave room for improvement, both in terms of manufacturing method and end product. The present invention is addressed to such improvement.

SUMMARY OF THE INVENTION

Briefly describing one aspect of the present invention, there is provided a thin film mirror comprising a frame, a thin plastic film having a reflective metal deposit on one side thereof, and a board. The frame is substantially L-shaped in cross-section and has a top flange and a side flange, each flange being folded in upon itself to form a hem. This frame configuration provides a rigid structure, but is given additional rigidity by attaching the board by an epoxy adhesive to the underside of the top flange's hem. The board also serves to protect the reflective metal layer of the thin film mirror from damage.

The thin film mirror is attached by two methods to the top flange of the frame. First, a strip of double-faced adhesive tape is pressed into place around an outer marginal portion of the top flange. Then, a bead of the epoxy adhesive is laid around an inner marginal portion of the top flange. Once this epoxy is laid, the thin film mirror is stretched over the frame, metallized side down, the non-stick backing is removed from the tape, and the film is pressed onto the tape. The epoxy is then allowed to cure.

If the thin film mirror contains any wrinkles or other imperfections once the epoxy adhesive has cured, these imperfections may be minimized, if not eliminated, by heat shrinking the thin plastic film. Any remaining imperfections at the periphery of the mirror may be covered, and the contrast between the center and the periphery improved, by overlaying the periphery with a single-faced opaque contrast tape.

Describing another aspect of the present invention, the thin film mirror may be constructed with an aperture through the board to minimize the effects of atmospheric pressure changes on the planar mirror surface. To prevent contaminants from entering the air space created between the thin film mirror and the board, a filter is used at the aperture to exclude contaminants which might otherwise enter the air space and damage the reflective metal layer of the mirror.

Accordingly, it is one object of the present invention to provide a thin film mirror in which the thin plastic film mirror is attached to the frame without necessarily heat shrinking the film.

Another object of the present invention is to provide a thin film mirror that does not require a protective resin on the metallized surface.

Another object of the present invention is to provide a thin film mirror having a lightweight frame with means to protect the metallized surface of the mirror from damage and to impart additional rigidity to the frame.

Another object of the present invention is to provide a thin film mirror in which a time-curing adhesive may be used without detrimental creep and sag during curing of the adhesive.

A further object of the present invention is to provide a thin film mirror having enhanced contrast between the primary useful area of the mirror and the marginal portions thereof.

Further objects and advantages of the present invention will be apparent from the following description.

DESCRIPTION OF THE PREFERRED EMBODIMENT

Figure 1:
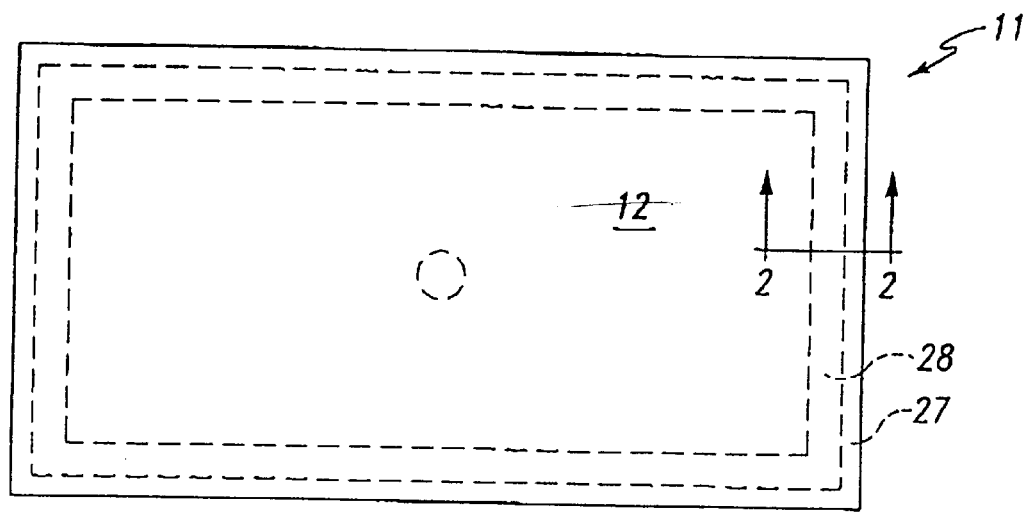
FIG. 1 is a front elevational view of a completed thin film mirror according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, and particularly FIG. 1, a rectangular mirror assembly 11 has a front face 12, the outer surface of which is a thin plastic film 13 with a reflective metal deposit 14 on the back face thereof. The film may be a polyester film 0.025 mm thick such as manufactured by Dupont of Wilmington, Del. under their stock number Mylar D. The metal coating may be vacuum-deposited silver or aluminum, (2 to 2.2 density units, for example), depending upon reflectivity and cost considerations.

A rectangular frame 16 is formed from a single, angle section strip of metal having what will be referred to herein as the top flange 17 and side flange 18, each of which is folded upon itself to provide a hemmed edge as shown. The top flange of the strip is notched to enable bending of the strip at the corners where the notch edges come together as at 19 when the frame is closed and the side flanges are welded together at the corner 21. The notch edges in the top flange can be welded together at the four corners, if desired, but it is not necessary. This frame is made of 22 gauge galvanized steel stock, for example.

While the frame 16 is reasonably rigid, additional support for it is provided by the installation of a board 22 fitting between the hems of the side flanges 18 and having its top surface 22T glued to the underside of the hem of the top flange by glue at 23. The glue 23 is actually a 24 hour setting epoxy such as produced by Thermoset Company of Indianapolis, Ind. under product number 300/66. The board is clamped in the frame by removable clamps during the epoxy curing period. The board edge may also be glued to the inner edge of the hem of the side flange at 24, if desired. As an example, the board may be a 0.5 inch or 1 inch thick closed cell, rigid urethane foam as manufactured by Celotex, Stock No. Tuf-R.

In at least one location on the board, a hole 25 is provided through the board. A filter plug 26 is placed in the hole. This plug is made of a char-ester open cell urethane foam. An example of such a plug is that marketed by Merryweather of Barberton, Ohio under the description and stock number E2020C4DF.

The mirror film 12 is secured to the top flange 17 in two ways. A strip of double-faced, pressure sensitive adhesive tape 27 is placed around the outer marginal portion of the top flange 17 of the frame. An example is a tape manufactured by 3M Company referred to as 3M No. 468 TESA 4965, ⅛ inch wide.

There is also a strip of the same epoxy adhesive material laid in a bead on top of the top flange 17 around the entire inner marginal portion of the flange at 28, the epoxy adhesive being deposited through a static nozzle by an X-Y robotic dispenser mixing the epoxy resin and hardener in the static nozzle as the mix is dispensed. The film is stretched over the frame. A silk screen stretcher such as, for example, the Accu-Stretch device by Tuf Products International can be used for this. The non-stick release medium backing is removed from the top of the tape strips 27. The film is placed and pressed onto the tape 27. Typically, the tape 27 occupies about ¼ of the width of the flange, while the bead of epoxy adhesive occupies about ¾ of the width of the flange. This tape will retain the film in the stretched condition until the epoxy at 28 has cured and secured the film permanently to the frame flange 17. At that point, this embodiment of the mirror is complete. During curing the epoxy 28 may bleed through the metallization 14 and adhere directly to the film 13, achieving an extremely tight bond.

The aperture 25 in the board behind the mirror film permits movement of air back and forth from and to the space between the film and the board to whatever extent is needed to compensate for temperature changes, and thus avoids any deformation of the planar mirror surface due to atmospheric pressure changes.

The epoxy material used to secure the board 22 to the flange at 23 and to secure the mirror film 13, 14 to the flange at 28, is a 24 hour cure material. It will cure at room temperature within that period of time. While a stretching device of a type used in silk screening may be used to stretch the film onto the frame, it is conceivable that some slight uneven stretching would occur. In that case, imperfections may be removed by heat shrinking the film somewhat in an oven or the like. This would be done after the curing of the adhesive at 28 around the entire internal marginal portion of the frame flange 17.

It is possible to see some slight imperfections in the surface of the thin film at the marginal portion thereof which is stuck to the top of the tape strip 27. Also, in mirrors for rear projection television applications, a high contrast is desired between the primary useful area of the mirror and the marginal portions thereof. According to the embodiment of the invention shown in FIG. 3, both high contrast and coverage of the outer marginal imperfections above the tape 28 are achieved by overlaying the marginal portion of the mirror with single-faced adhesive tape 31. This tape is applied to the top of the film 13 around the entire perimeter of the mirror. It is a black masking tape such as is available from American Tape of Detroit, Mich. under their catalog number PB-1.

Figure 2:
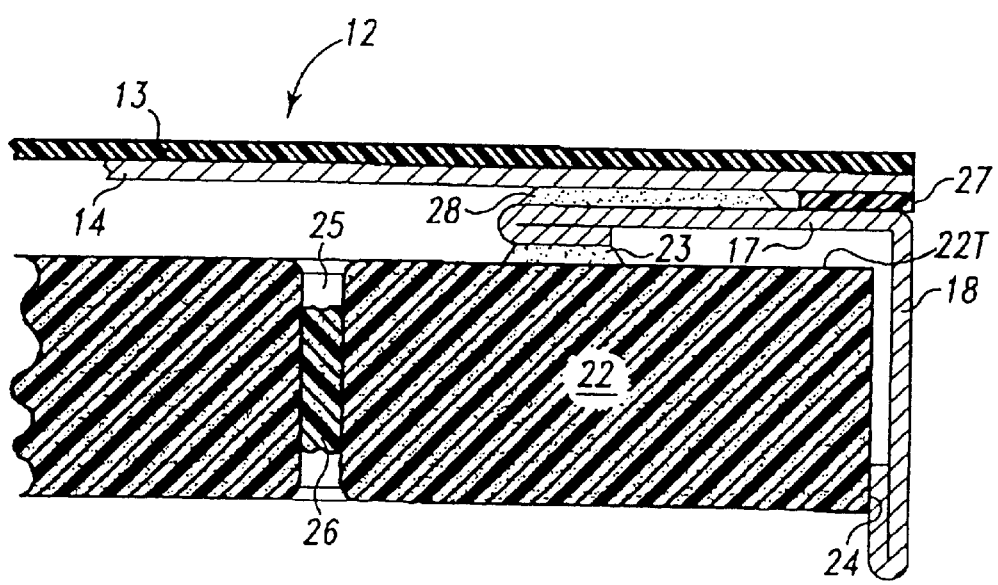
FIG. 2 is a cross sectional view taken at line 2—2 in FIG. 1 and viewed in the direction of the arrows.
Figure 3:
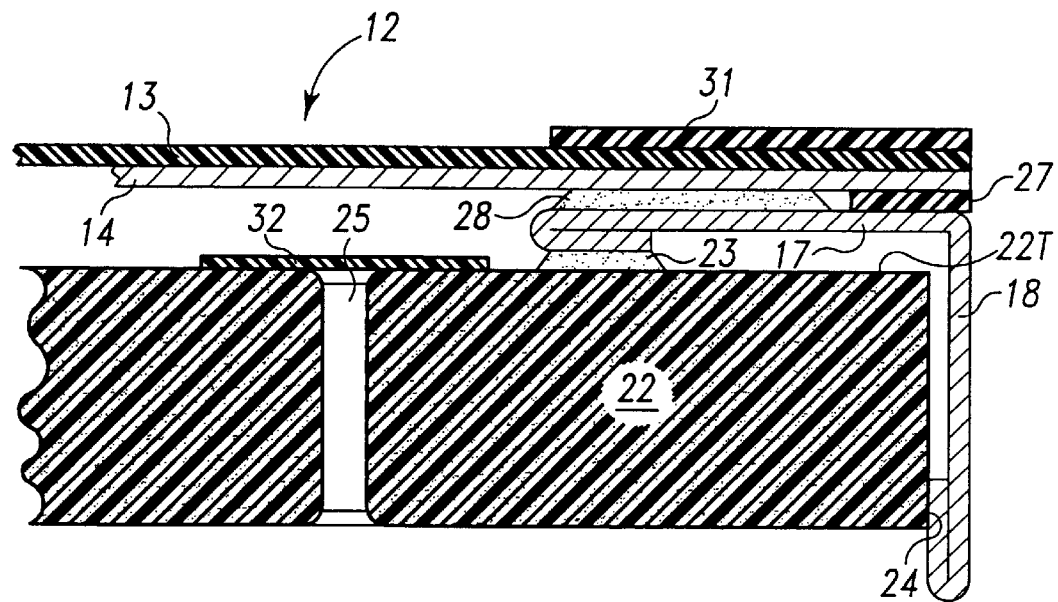
FIG. 3 is a cross sectional view like FIG. 2 but in a different embodiment of the invention.
Figure 4:
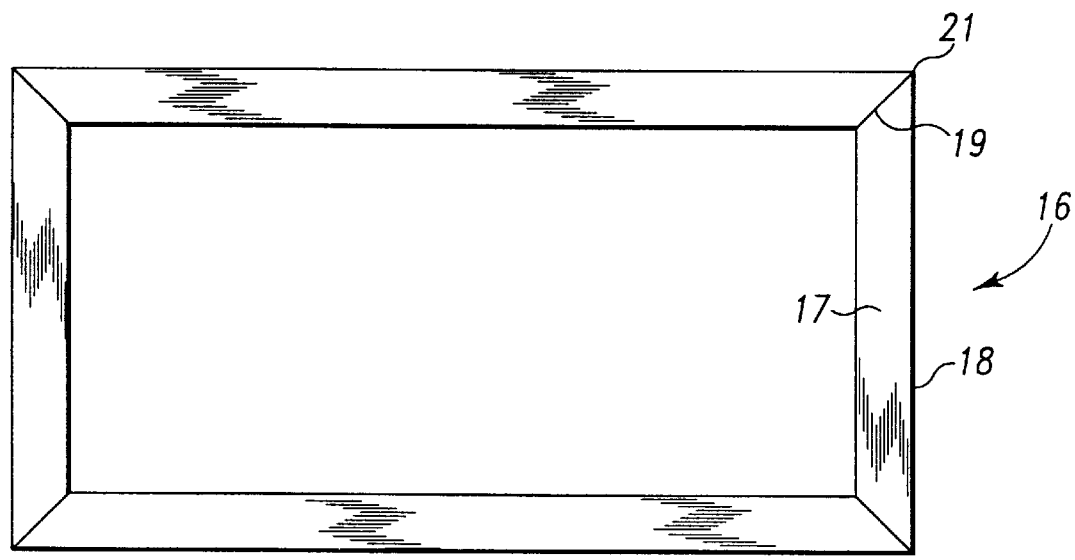
FIG. 4 is a front view of the mirror frame useful in either the FIG. 2 or FIG. 3 embodiment.

Another feature shown in the FIG. 3 embodiment, and which can also be used in the FIG. 2 embodiment, is a piece of tape 32 adhesively secured to the top 22T of the board 22 over the hole 25. An example is a non-woven filter tape known as a waterproofed, DuPont spun-bound polyester tape marketed under the style name Remay, Model No. 2200.

Regardless of whether the mirror is made according to the construction of FIG. 2 or FIG. 3, it is not necessary that there be a protective coating on the underside of the metal reflective deposit. This is true regardless of whether it is silver or aluminum. It is known that a true silver deposit is not likely to be deteriorated over the useful life of the mirror in any case. In the case of aluminum, the chances of deterioration are minimized due to the utilization of the filter such as 26 in FIG. 2, plugging the hole, or alternatively, covering the hole such as with the filter tape 32 covering the hole as in FIG. 3. It should also be understood that either the plug or the tape can be used regardless of whether the contrast tape 31 is or is not used on the mirror.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A thin film mirror comprising:

a frame, said frame having an upper support surface and a lower support surface;

a board adhered to said lower support surface, said board defining an aperture therethrough;

a mirror film adhered to said upper support surface, said mirror film defining a perimeter, wherein said board and said mirror film define an air space therebetween;

said frame being substantially L-shaped in cross-section, said frame having a top flange and a side flange; and wherein said upper support surface is formed from an upper surface of said top flange and is substantially co-planar therewith; and further wherein said lower support surface is formed from a lower surface of said top flange and is substantially co-planar therewith.

2. The thin film mirror of claim 1, and further comprising:

a contrast tape adhered to said mirror film; and wherein said contrast tape is disposed over said perimeter of said mirror film.

3. The thin film mirror of claim 2, wherein said board is a closed cell rigid plastic foam material.

4. The thin film mirror of claim 3, wherein said mirror film comprises:

a layer of thin plastic film; and a reflective material layer, said reflective material layer including at least one of the following elements: aluminum, silver.

5. A thin film mirror assembly comprising:
a frame, said frame having a top portion defining a perimeter of the mirror assembly and extending in a plane inward from the perimeter, and the top portion having an upwardly facing upper support surface and a downwardly facing lower support surface substantially co-planar therewith;
a board adhered to said lower support surface, said board defining an aperture therethrough;
a mirror film adhered with adhesive tape to said upper support surface, said mirror film extending immediately adjacent said plane across the mirror from one portion of the perimeter to an opposite portion of the perimeter, said frame and said board and said mirror film defining an air space therebetween; and
a filter associated with said aperture, said filter being adapted to permit movement of air in said aperture from and to said air space but exclude contaminants from passage through the filter into said air space.

6. The thin film mirror assembly of claim 5, and wherein:
the filter is a tape covering said aperture.

7. The thin film mirror assembly of claim 5, and wherein:
the filter is a filter plug contained within said aperture.

8. The thin film mirror assembly of claim 5, and further comprising:
a pressure-sensitive adhesive contrast tape adhered to said mirror film; and wherein said mirror film has an outer marginal portion extending inward from the perimeter, and
said contrast tape is disposed overlying the marginal portion of said mirror film and defining the perimeter of a primary useful area of the mirror.

9. The thin film mirror assembly of claim 5, and further comprising:
a double faced, pressure-sensitive adhesive strip along a portion of the upper support surface and adhering the mirror film to the upper support surface.

10. The thin film mirror assembly of claim 9, and further comprising:
an epoxy adhesive along a portion of the upper support surface and adhering the mirror film to the upper support surface.

11. The thin film mirror assembly of claim 10, wherein:
the pressure sensitive adhesive strip is placed along an outer marginal portion of the upper support surface of the frame adjacent the perimeter; and wherein
the epoxy adhesive is placed along an inner marginal portion of the upper support surface.

12. The thin film mirror assembly of claim 11, and wherein:
said epoxy adhesive is cured to adhere the mirror film to the epoxy adhesive.

13. A method for manufacturing a thin film mirror assembly comprising the steps of:
(a) providing a frame having a top portion and a bottom portion and an upwardly facing upper support surface and a downwardly facing lower support surface on the top portion;
(b) applying a double-sided pressure-sensitive adhesive tape to a first portion of said upper support surface;
(c) applying an adhesive to a second portion of said upper support surface;
(d) providing a mirror film;
(e) juxtaposing said adhesive tape-and adhesive-bearing support surface to said mirror film;
(f) tensioning said mirror film to a substantially planar disposition;
(g) adhering said mirror film to said tape;
(h) applying an adhesive to said lower support surface;
(i) providing a board;
(j) juxtaposing said adhesive-bearing lower support surface to said board and placing said board against the adhesive applied to said lower support surface; and
(k) curing said adhesive applied to said lower support surface and thereby attaching and sealing the board to said lower support surface.

14. The method of claim 13, and further including the steps of:
(m) providing a contrast tape; and
(n) applying said contrast tape to said mirror film above said double-sided adhesive tape.

15. The method of claim 13, and further including the steps of:
(m) providing an aperture in the board; and
(n) providing a filter associated with said aperture, said filter being adapted to permit movement of air in said aperture from and to said air space but exclude contaminants from passage through the filter into said air space.

16. The method of claim 15, wherein said filter comprises a plug contained within said aperture.

17. The method of claim 15, wherein said filter comprises a tape covering said aperture.

18. The method of claim 15, and further including the steps of:
(o) providing a contrast tape; and
(p) applying said contrast tape to said mirror film above said double-sided adhesive tape around a periphery of the frame and thereby defining an opaque, non-reflective perimetrical contrast tape marginal portion framing a reflector portion of said mirror film.

19. The method of claim 18, wherein said filter comprises a plug contained within said aperture.

20. The method of claim 18, wherein said filter comprises a tape covering said aperture.

21. A thin film mirror assembly comprising:
a frame;
a first holding ring disposed on said frame, said first holding ring comprising a double-sided adhesive tape;
a second holding ring disposed adjacent said first holding ring on said frame, said second holding ring comprising an adhesive;
a mirror film, said mirror film defining a perimeter; and said first and second holding rings attaching said mirror film to said frame;
a board;
said frame being substantially L-shaped in cross-section, said frame having a top flange and a side flange; wherein
said top flange comprises an upper support surface and a lower support surface; wherein
said first and second holding rings are disposed on said upper support surface; and wherein
said board is attached to said lower support surface.

22. The thin film mirror assembly of claim 21, and further comprising:

a contrast tape adhered to the top of said mirror film; and wherein said contrast tape is disposed overlapping the marginal portion of said mirror film and defines the perimeter of a primary useful area of the mirror.

23. The thin film mirror assembly of claim 21, wherein said mirror film comprises:

a layer of thin plastic film; and a reflective material layer, said reflective material layer including at least one of the following elements: aluminum, silver, chromium.

24. The thin film mirror assembly of claim 21, wherein said adhesive comprises a time-curing epoxy.

* * * * *